United States Patent [19]
Roselli et al.

[11] Patent Number: 5,828,166
[45] Date of Patent: Oct. 27, 1998

[54] IMAGE INTENSIFIER SYSTEM INCORPORATED INTO A REMOVABLE LENS DAYLIGHT IMAGING SYSTEM

[75] Inventors: Michael Roselli, Nutley; Frank Vallese, Lincoln Park; Gerard DiTaranto; Robert Lindner, both of Parsippany, all of N.J.

[73] Assignee: Electrophysics Corp., Fairfield, N.J.

[21] Appl. No.: 712,561

[22] Filed: Sep. 11, 1996

[51] Int. Cl.⁶ ..................................................... H01J 31/50
[52] U.S. Cl. ........................ 313/365; 313/523; 313/524; 250/214 VT
[58] Field of Search .................................... 313/365, 523, 313/524; 250/214 VT; 359/435

[56] References Cited

U.S. PATENT DOCUMENTS

| | | | |
|---|---|---|---|
| 4,067,045 | 1/1978 | Provost et al. | 250/214 VT |
| 4,682,021 | 7/1987 | Fitts | 313/523 |
| 4,734,573 | 3/1988 | Dill | 250/214 VT |
| 5,408,088 | 4/1995 | Chapman et al. | 250/214 VT |

Primary Examiner—Sandra L. O'Shea
Assistant Examiner—Joseph Williams
Attorney, Agent, or Firm—Hoffman, Wasson & Gitler

[57] ABSTRACT

An intensifying system adapted to be affixed to an electronic imaging device such as a single lens reflex camera or a video camera. The system includes a central intensifying unit for intensifying an image at lower light levels. A back body adapter and a front lens adapter would combine with the central intensifying unit and would be attached to the body of the camera. An electronic objective lens which is normally attached to the camera, would be removed and would be affixed to the front lens adapter.

5 Claims, 5 Drawing Sheets

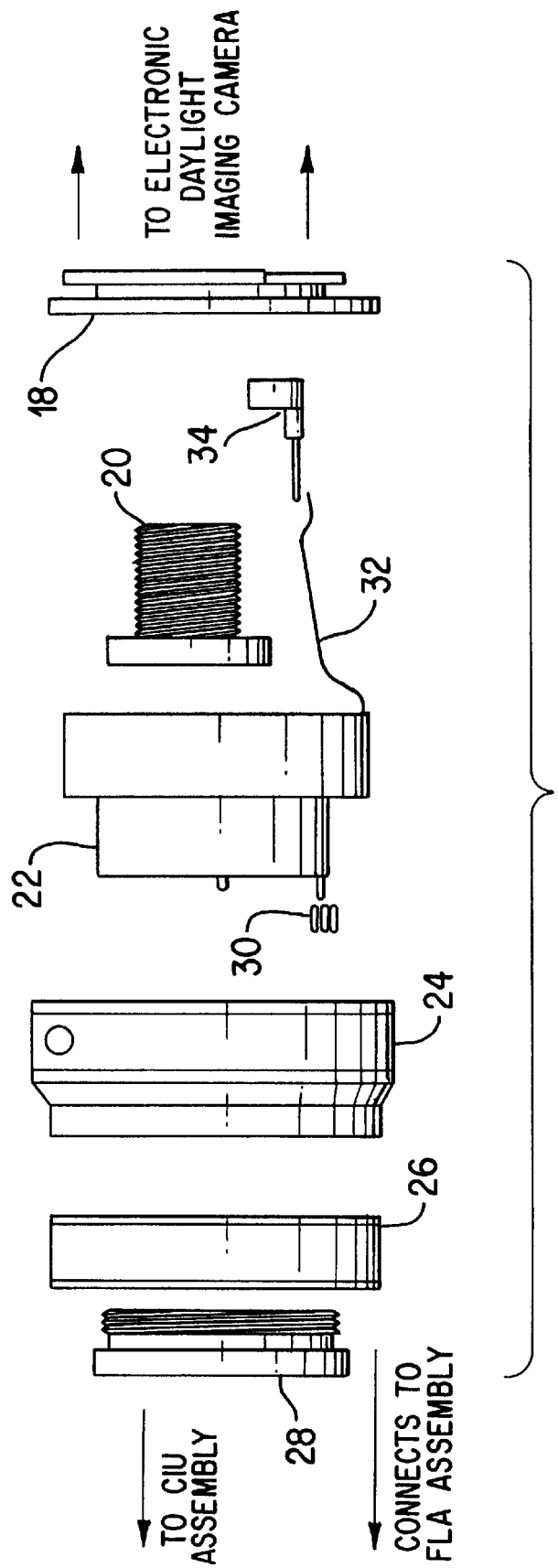

IMAGE INTENSIFIER SYSTEM INCORPORATED INTO A REMOVABLE LENS DAYLIGHT IMAGING SYSTEM

BACKGROUND OF THE INVENTION

1. Field of the Invention

The present invention is designed to be incorporated into electronic daylight imaging systems such as single-lens reflex (SLR) cameras (digital and film tape) and video cameras.

2. Description of the Prior Art

Imaging equipment such as single reflex cameras and professional video cameras take excellent photographs or movies when they operate in an environment in which sufficient light is provided. These daylight imaging systems must be supplemented by flash lamps or illuminators which are either attached to the camera or built therein to provide adequate lighting in lower light level environments in which the daylight is not sufficient to take an adequate picture or movie. Since flash attachments or similar lighting devices cannot be used in every low level environment, the imaging industry has developed and has been utilizing technology which would amplify the low light levels in the environment allowing a picture to be taken without the use of these external light sources. These devices are similar in some respects to night-vision equipment which has been employed by the armed forces for many years.

The systems currently used by the imaging industry generally consist of an image intensifier provided in a housing, a focusable relay lens adapter and an objective lens adapter. These systems would be attachable to the camera and would require a separate source of power, such as rechargeable or non-rechargeable batteries. These prior art systems would require that the relay lens be refocused for each intensifier housing to assure proper focusing of the camera. These systems also do not allow for the electronic operation of objective lenses, would need separate on/off switches and would not be optimized for the daylight imager.

SUMMARY OF THE INVENTION

These and other deficiencies of the prior art are addressed by the present invention which utilizes a central intensifier unit (CIU) used to amplify light received through a photographic systems objective lens. The CIU is designed so that it can be configured to attach to any daylight imaging system without readjustments or refocusing. The CIU is designed so that the input image plane is a fixed pre-defined distance from its front flange and the output image plane is a fixed pre-defined distance from its back flange. The CIU is positioned against a back body adapter (BBA) which is in turn attached to the body of the camera after its electronic lens is removed. The CIU is also positioned against a front lens adapter (FLA) onto which the electronic objective lens is re-attached.

The BBA is directly attached to a connector associated with the camera, thereby allowing the present invention to utilize the electronics and the power supply of the electronic daylight imager, such as the SLR camera. The BBA includes a relay lens which does not need refocusing for each CIU when the present invention is attached to different daylight imagers. Due to the direct connection between the imager's power supply and the present invention, a separate on/off switch would not be required. The imaging system, including the repositioned electronic objective lens of the electronic daylight imager such as an SLR camera would allow the imaging system to electronically communicate in its intended fashion, and maintain the integrity of the lens and sensor image planes.

Other object and advantages of the invention would become apparent upon the following detailed description with references to the drawings. Throughout the drawings, like reference numerals refer to like parts.

BRIEF DESCRIPTION OF THE DRAWINGS

FIG. 2 is an exploded view of the back body adapter of the present invention;

DETAILED DESCRIPTION OF THE DRAWINGS

Figure 1:
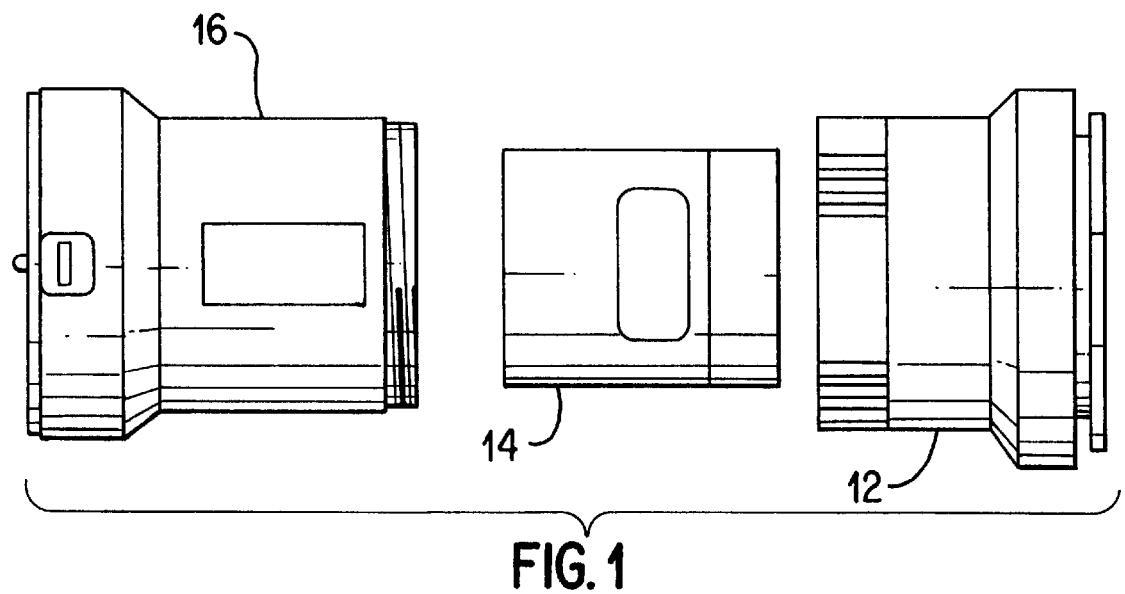
FIG. 1 is a view of the three main components of the imaging system of the present invention.

A view of the main components of the intensifying imaging system 10 is shown in FIG. 1. This system would include a back body adapter (BBA) 12 which is directly connected to daylight imaging system, such as a single lens reflex (SLR) camera or a video camera. The electronic objective lens of the electronic imaging system would be removed and the BBA attached thereto in the manner which would be subsequently explained. The intensifying imaging system contains a central intensifying unit (CIU) 14 which would be provided between the BBA 12 and a front lens adapter (FLA) 16. The electronic objective lens which was originally directly attached to the electronic daylight imager would be reattached to the front of the FLA 16 in the manner which will be subsequently explained.

As shown in FIG. 2, the BBA incorporates an electronic daylight imaging lens mount 18 which is similar to that used to mount an electronic objective lens to the daylight imaging system, such as the SLR or a video camera. When the electronic objective lens is removed from the daylight imager, the BBA is attached thereto in the same fashion that the lens would be attached to the camera, typically by matching male and female flanges and by rotating the imaging system of the present invention. A pre-focused and optimized relay lens 20 is provided within the BBA. This lens system is designed to project the intensified image from the CIU to the image sensor in the host electronic imaging system. The relay lens consists of a lens projector for which the object is the intensifier tube phosphor provided within the CIU having the appropriate image size. The magnification is such that the image is appropriately sized, for example, one times magnification. The BBA includes a chassis 24 into which a pin block 22 and the relay lens 20 would be incorporated.

The pin block 22 is connected to a camera connector block 34 through the use of a connection cable 32. A hot-shoe connection is made between the BBA's camera connector block and the camera's internal connector block by the mechanical connection hereinabove explained, thereby automatically making the proper electrical connections between the BBA and the camera when the mechanical connections are made between the BBA and the camera. A plurality of contact pins 30 are provided associated with the pin block which will allow connection between the electronics and the power supply of the camera with the CIU, the FLA and the electronic objective lens. A connector ring 26 and a capture ring 28 will allow the CIU to be adapted by the BBA while maintaining the proper focusing distances.

Figure 3:
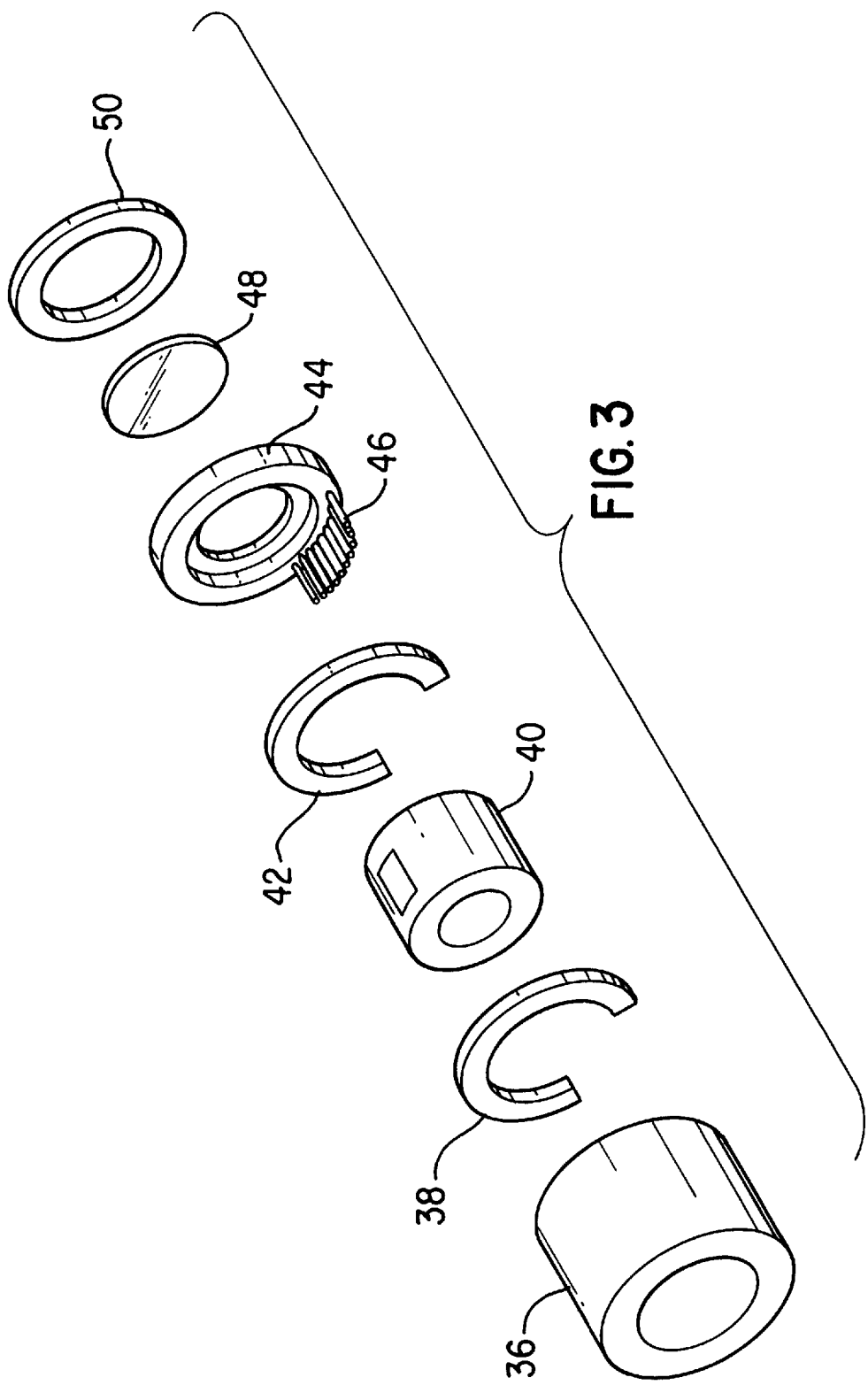
FIG. 3 is an exploded view of the central intensifying unit of the present invention.

FIG. 3 shows an exploded view of the CIU 14. This CIU includes a chassis 36 into which an image intensifier tube 40 is encased. This chassis is designed to allow the image received from the electronic objective lens to be intensified within the image intensifier 40 and then to be sent to the electronic daylight imaging camera. It is noted that the particular design of the present invention would allow the electronic daylight imaging camera to treat the present invention as it were an electronic objective lens. A rear cap 44 containing a plurality of contact pins 46 would allow for the electrical connection between the BBA 12, the CIU 14, and the FLA 16. The input image plane of the image intensifier 40 is placed at a fixed distance from the front of the CIU chassis 36. Likewise, the location of the output image plane of the image intensifier 40 is at a fixed distance from the back of the CIU chassis. Spacers 38 and 42 would allow the image intensifier to be properly positioned within the CIU chassis 36. An optical window 48 is provided within a window holder 50 such that dirt and dust will not get onto the image planes.

Figure 4:
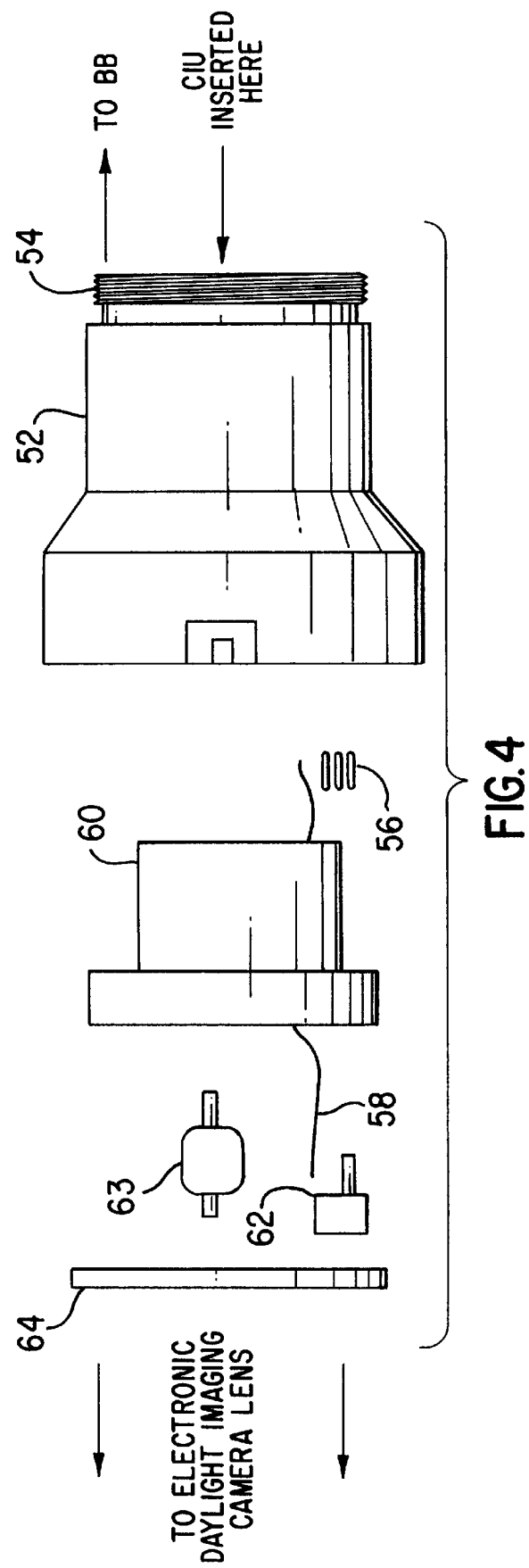
FIG. 4 is an exploded view of the front lens adapter of the present invention.

The front lens adapter (FLA) 14 is illustrated with respect to FIG. 4. The FLA includes a chassis 52 having a plurality of threads 54 which would allow the chassis 52 to be connected to the BBA 12 with the CIU 14 therebetween. This chassis may or may not include optics used to convert the image format into an optimized format. This determination would be made based upon the type of image sensor provided within the respective camera. Contact pins 56 are provided within the FLA 16 to allow connection with the pins 46 of the CIU 14. These pins 46 would extend through holes 37 provided in the CIU chassis 36 and would then be connected to the pins 56. These pins are then connected to a wire 58 connected to a pin block 60 which in turn is connected to a connector block 62. The FLA is provided with a lens mount 64 onto which the electronic objective camera lens would be mounted. The electronic objective lens is connected to the mount 64 in a manner similar to the connection of the BBA 12 to the camera body by matching male and female flanges and by rotating the lens in order to make a connection therebetween. Similarly, a hot-shot connection is made between the electronic objective lens and the connector block 62. Alternatively, an appropriately positioned locking ring can be utilized. Furthermore, a lock button 63 is employed to insure that the electronic objective lens is properly connected to the front of the FLA. The FLA makes use of the fixed flange distance of the CIU to assure objective lens focus integrity.

Mechanically, the present invention exploits the fact that the camera image sensor is a fixed distance from the lens flange and projects an intensified image onto the camera image sensor that does not require focus adjustment.

Figure 5:
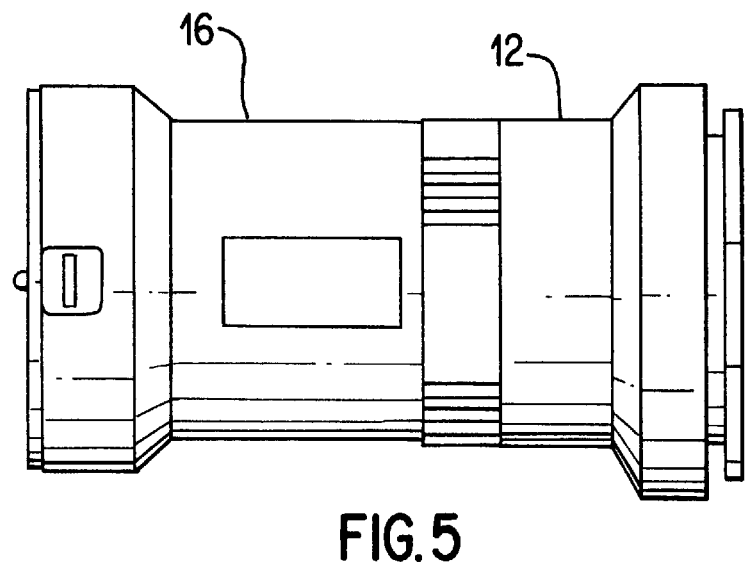
FIG. 5 is a view of the fully assembled module of the present invention.

FIG. 5 illustrates the fully assembled module of the present invention in which the CIU is provided within the combination of the BBA 12 and the FLA 16.

Figure 6:
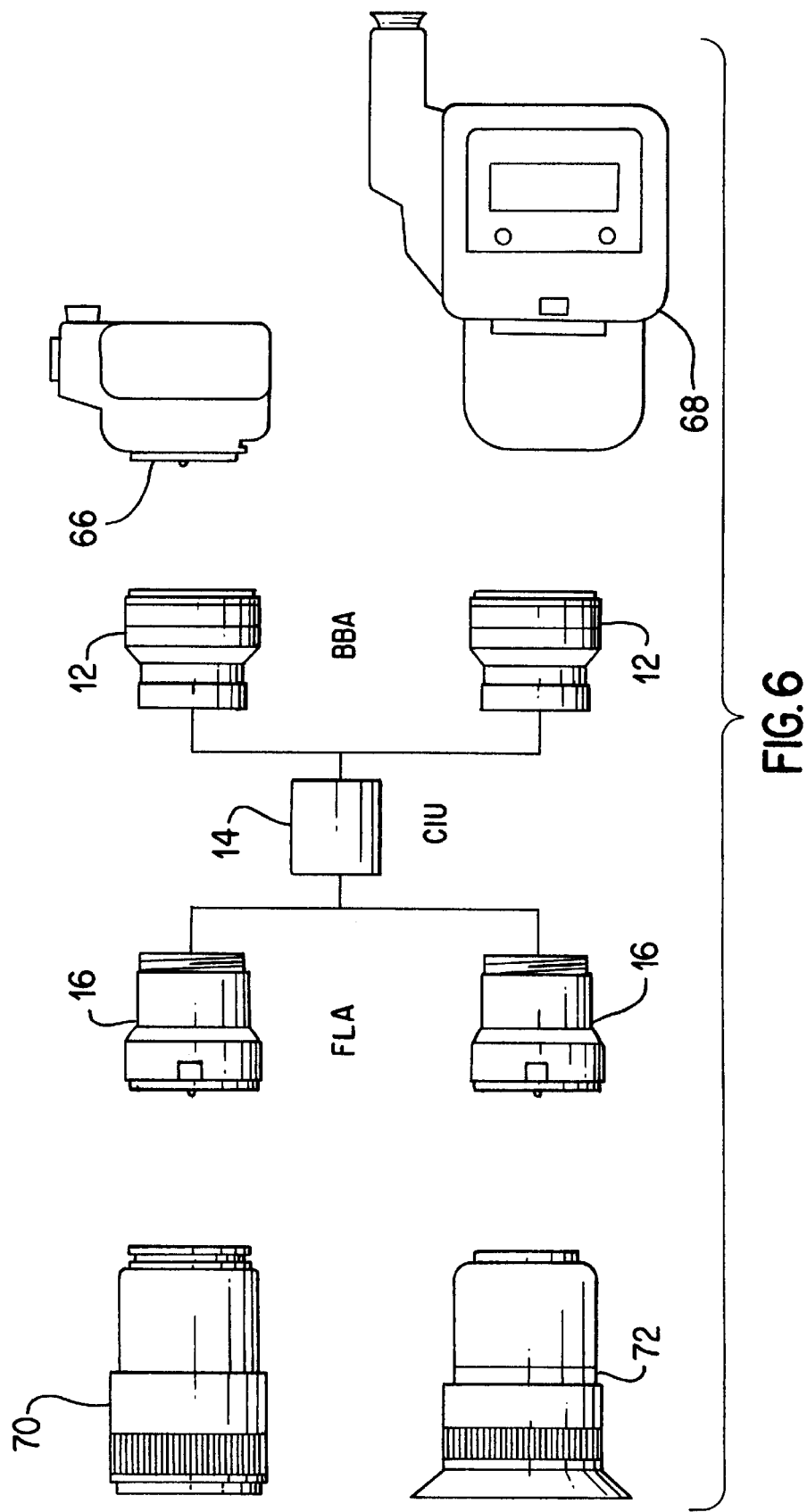
FIG. 6 is a view showing the connection of the present invention to various daylight imaging systems.

FIG. 6 illustrates a view in which the present invention including the BBA 12, the CIU 14 and the FLA 16 are connected between various electronic lens 70 and 72 with respective SLR cameras 66 or video cameras 68. It is noted that to maintain the proper image plane, based upon the lens or cameras which would be utilized, the geometry of the FLAs 16 and the BBAs 12 might be slightly changed. However, it is noted that the geometry of the CIU 14 will be maintained.

While the invention is described in connection with preferred embodiments and various drawings, it will be understood that it is not intended to limit the invention to these embodiments or drawings. On contrary, it is intended to cover all alternatives, modifications and equivalents, as may be included in the spirit and scope of this invention as defined by the appended claims.

What is claimed:

1. A system for intensifying an image in low light environments, said system connected to a camera provided with a removable electronic objective lens, the camera provided with an internal source of power and an electronic control; the system comprising:

a back adapter mechanically and electrically connected to the camera;

an intensifier means for intensifying an image, said intensifier including an image intensifier, said intensifier means mechanically and electrically connected to said back adapter; and a front lens adapter mechanically and electrically connected to said intensifier means, said front lens adapter provided with a mount for attachment to the removable electronic objective lens, where an image is directed through said front lens adapter, through said intensifier means for intensifying the image, said intensified image directed through said back adapter to a surface provided within the camera.

2. The system in accordance with claim 1 wherein said back adapter is provided with a pre-focused relay lens.

3. The system in accordance with claim 1 further including a window mount attached to said intensifying means and an optical window provided within said window mount for preventing dust and dirt from impinging upon an output image plane.

4. The system in accordance with claim 1 wherein said intensifying means comprises an image intensifier, a chassis having a first and second end and a rear cap, wherein said image intensifier is inserted into said chassis and said rear cap is connected to one end of said chassis, and further wherein the input image plane of said image intensifier is placed at a fixed distance from said first end of said chassis and the output image plane of said image intensifier is placed at a fixed distance from said second end of said chassis.

5. The system in accordance with claim 4 further including first and second spacers within said chassis for properly positioning said image intensifier within said chassis.

\* \* \* \* \*